United States Patent
Campos et al.

(10) Patent No.: US 7,656,610 B1
(45) Date of Patent: Feb. 2, 2010

(54) BI-DIRECTIONAL MAGNETIC RECORDING HEAD BUILT ON A COMMON SUBSTRATE

(75) Inventors: Francis Campos, Louisville, CO (US); Kevin Dale McKinstry, Denver, CO (US)

(73) Assignee: Storage Technology Corporation, Louisville, CO (US)

( * ) Notice: Subject to any disclaimer, the term of this patent is extended or adjusted under 35 U.S.C. 154(b) by 558 days.

(21) Appl. No.: 11/389,901

(22) Filed: Mar. 27, 2006

(51) Int. Cl.
*G11B 5/29* (2006.01)
*G11B 5/31* (2006.01)
*G11B 5/39* (2006.01)

(52) U.S. Cl. .................. 360/121; 360/316; 360/317

(58) Field of Classification Search ............ 360/64, 360/121, 129, 316, 317
See application file for complete search history.

(56) References Cited

U.S. PATENT DOCUMENTS

| | | | |
|---|---|---|---|
| 3,846,841 A * | 11/1974 | Lazzari et al. ............ | 360/121 |
| 3,890,558 A | 6/1975 | Guisinger et al. | |
| 3,893,188 A | 7/1975 | Shoemaker | |
| 4,254,500 A | 3/1981 | Brookhart | |
| 4,731,676 A | 3/1988 | Berlekamp | |
| 4,808,900 A | 2/1989 | Ohlinger et al. | |
| 5,018,034 A | 5/1991 | Tanaka et al. | |
| 5,034,838 A | 7/1991 | Brock et al. | |
| 5,121,270 A | 6/1992 | Alcudia et al. | |
| 5,208,714 A | 5/1993 | Denison et al. | |
| 5,293,280 A | 3/1994 | Ishikawa et al. | |
| 5,394,285 A | 2/1995 | Sundaram et al. | |
| 5,423,116 A | 6/1995 | Sundaram | |
| 5,523,904 A | 6/1996 | Saliba | |
| 5,576,905 A | 11/1996 | Garcia et al. | |
| 5,585,977 A | 12/1996 | Gooch | |
| 5,678,086 A | 10/1997 | Gandola et al. | |
| 6,016,233 A | 1/2000 | Scholz et al. | |
| 6,097,570 A * | 8/2000 | Dee ......................... | 360/121 |
| 6,195,232 B1 | 2/2001 | Cohen | |
| 6,222,698 B1 | 4/2001 | Barndt et al. | |
| 6,305,629 B1 | 10/2001 | Chliwnyj et al. | |

(Continued)

FOREIGN PATENT DOCUMENTS

JP      62273615 A   *   11/1987

(Continued)

OTHER PUBLICATIONS

Robinson et al., "Breaking the Limits of Traditional Tape Technology Creating a New Paradigm for Tape Storage", Tandberg Data, lttoolbox, Mar. 25, 2002, pp. 1-7, retrieved Mar. 16, 2006. http://storage.ittoolbox.com/white-papers/breaking-the-limits-of-traditional-tape-technology-creating-a-new-paradigm-for-tape-storage-1777.

*Primary Examiner*—William J Klimowicz
(74) *Attorney, Agent, or Firm*—Brooks Kushman P.C.

(57) ABSTRACT

The aspects of the present invention provide a magnetic recording head, a method for manufacturing a magnetic recording head, and a magnetic recording head drive. The magnetic recording head includes a substrate and a first magnetic device connected to the substrate. The magnetic recording head also includes a second magnetic device connected to the first magnetic device. The first magnetic device is aligned with the second magnetic device. The first and second magnetic devices are supported by the same side of the substrate.

2 Claims, 7 Drawing Sheets

U.S. PATENT DOCUMENTS

| | | | |
|---|---|---|---|
| 6,496,329 B2 | 12/2002 | Hungerford et al. | |
| 6,577,469 B2 | 6/2003 | Kennedy et al. | |
| 6,611,167 B2 | 8/2003 | McMahon et al. | |
| 6,611,398 B1 | 8/2003 | Rumpler et al. | |
| 6,778,359 B1* | 8/2004 | Iwama | 360/129 |
| 6,914,756 B2* | 7/2005 | Molstad et al. | 360/316 |
| 6,952,330 B1 | 10/2005 | Riddering et al. | |
| 6,958,956 B1 | 10/2005 | Jacquet et al. | |
| 6,965,563 B1 | 11/2005 | Hospodor et al. | |
| 7,400,474 B2* | 7/2008 | Biskeborn et al. | 360/323 |
| 7,453,671 B1* | 11/2008 | Nibarger et al. | 360/316 |
| 7,486,475 B2* | 2/2009 | Biskeborn | 360/121 |
| 7,486,476 B2* | 2/2009 | Biskeborn | 360/121 |
| 2003/0035248 A1* | 2/2003 | Daby et al. | 360/317 |
| 2004/0021982 A1* | 2/2004 | Ozue et al. | 360/121 |
| 2004/0060163 A1 | 4/2004 | Biskeborn et al. | |
| 2004/0061967 A1 | 4/2004 | Lee et al. | |
| 2004/0141255 A1* | 7/2004 | Ogawa et al. | 360/129 |
| 2004/0160693 A1 | 8/2004 | Meyer | |
| 2005/0174688 A1* | 8/2005 | Ozue et al. | 360/129 |
| 2005/0174689 A1* | 8/2005 | Ozue et al. | 360/129 |
| 2005/0200887 A1 | 9/2005 | Bai | |
| 2006/0039082 A1* | 2/2006 | Biskeborn et al. | 360/129 |
| 2007/0030594 A1* | 2/2007 | Biskeborn et al. | 360/129 |
| 2007/0097556 A1* | 5/2007 | Biskeborn et al. | 360/317 |
| 2007/0133131 A1* | 6/2007 | Biskeborn | 360/323 |

FOREIGN PATENT DOCUMENTS

| | | | |
|---|---|---|---|
| JP | 01137421 A | * | 5/1989 |
| JP | 01303617 A | * | 12/1989 |
| JP | 03252911 A | * | 11/1991 |
| JP | 2001052306 A | * | 2/2001 |
| JP | 2003338012 A | * | 11/2003 |

* cited by examiner

BI-DIRECTIONAL MAGNETIC RECORDING HEAD BUILT ON A COMMON SUBSTRATE

CROSS-REFERENCE TO RELATED APPLICATIONS

The subject matter of the present invention is related to co-pending U.S. application Ser. No. 11/389,842, titled "Multi-Level, Multi-Track Magnetic Recording Head", filed on the same date herewith, assigned to the same assignee, and incorporated herein by reference.

BACKGROUND OF THE INVENTION

1. Field of the Invention

The present invention relates generally to a magnetic recording head and a method for manufacturing a magnetic recording head. Still more particularly, the present invention relates to a bi-directional magnetic recording head built on a single substrate and a method for building the bi-directional magnetic recording head built on a single substrate.

2. Description of the Related Art

Thin film linear tape heads are typically made with two arrays of devices, with each array capable of both reading and writing data. Typically, around eight or sixteen devices exist in a single array. Each array is physically built on a separate substrate, and then positioned with respect to each other to form the finished magnetic recording head. This positioning allows for the data written by one array to be read immediately after by the other array. As such, the alignment of devices between the two arrays of devices is critical. Each device in the write array corresponds to a device in the read array. Improperly aligned arrays can result in corrupted data written on the magnetic recording head or the inability to read back the written data. The problem is magnified as the size of each individual device on the array decreases to accommodate smaller bit sizes, and hence increased capacity, on the tape. The increased alignment precision can substantially increase the cost and difficulty of processing magnetic recording heads.

SUMMARY OF THE INVENTION

The aspects of the present invention provide a magnetic recording head, a method for manufacturing a magnetic recording head, and a magnetic recording head drive. The magnetic recording head includes a substrate and a first magnetic device connected to the substrate. The magnetic recording head also includes a second magnetic device connected to the first magnetic device. The first magnetic device is aligned with the second magnetic device. The first and second magnetic devices are supported by the same side of the substrate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
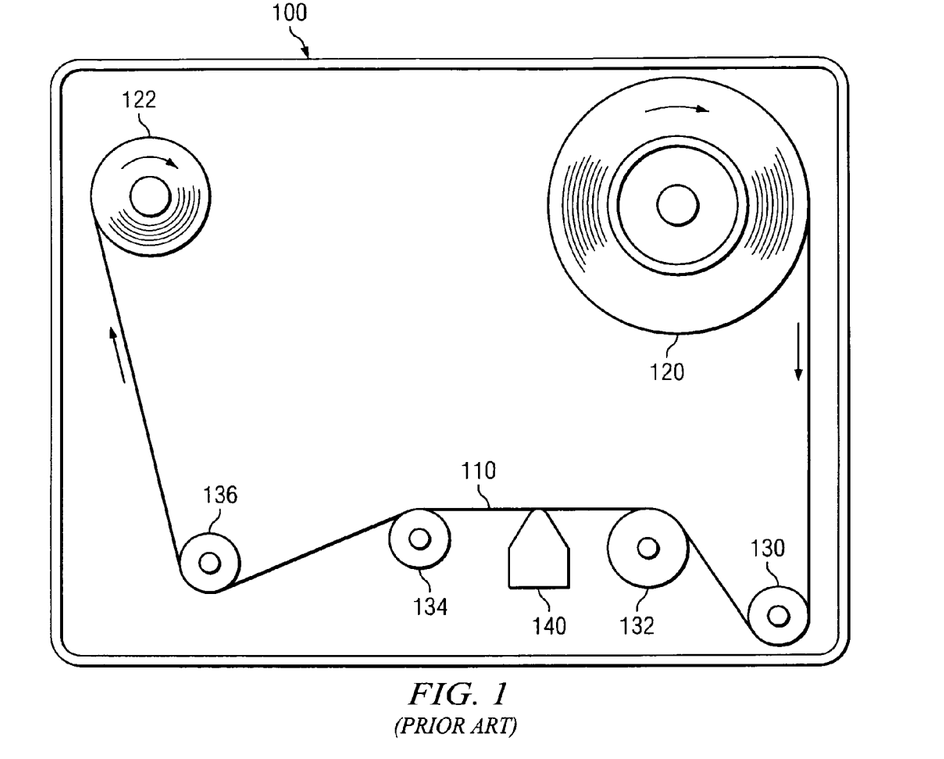
FIG. 1 is a schematic diagram of a magnetic recording head drive in which an illustrative embodiment of the present invention may be implemented.

FIG. 1 is a schematic diagram of a magnetic recording head drive in which an illustrative embodiment of the present invention may be implemented. Magnetic recording head drive 100 includes recording media 110, reels 120 and 122, guide rollers 130, 132, 134, and 136, and magnetic recording head 140. Recording media 110 is a magnetically coated plastic strip on which data is written. Recording media 110 is wound on reels 120 and 122. Reels 120 and 122 facilitate recording media 110 to move from one reel to another. In the illustrative example, recording media 110 travels in a clockwise direction around reels 120 and 122, thereby moving from reel 120 to reel 122. Guide rollers 130, 132, 134, and 136 direct the movement of recording media 110 between reels 120 and 122 and over magnetic recording head 140.

Magnetic recording head 140 typically includes several modules mechanically assembled together. Each module is composed of a single level array of read, write, read-write, or a combination of read and write devices built on a ceramic substrate. The ceramic substrate is typically made from aluminum titanium carbide (AlTiC). The inductive write devices in magnetic recording head 140 generate a magnetic flux bubble that causes a signal to be imprinted on the magnetic material on recording media 110. The imprinted signal is data written onto recording media 110. When the magnetoresistive read sensor passes over the imprinted signal, the resistance of the sensor changes. By running a small current through the read device and measuring the voltage variation, the read device is able to interpret the data recorded on recording media 110 and transmit the data in an appropriate form to a user.

The aspects of the present invention may also be implemented in a reel-to-reel magnetic recording head, a video tape, or any device utilizing a magnetic recording media.

Additionally, the aspects of the present invention are not limited to the illustrative example. Many modifications and variations will be apparent to those of ordinary skill in the art.

Figure 2:
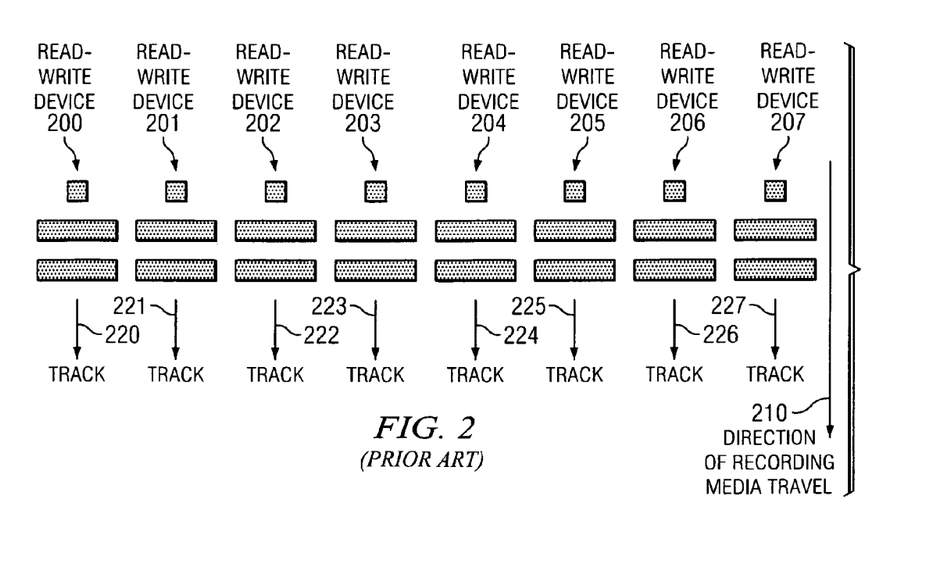
FIG. 2 is a schematic diagram of a conventional multi-track magnetic recording head.

FIG. 2 is a schematic diagram of a conventional multi-track magnetic recording head array. Read-write devices 200 through 207 are devices that may be found on magnetic recording head 140 of FIG. 1. Read-write devices 200 through 207 are the conventional schematic symbols for a read-write device. Read-write devices 200 through 207 are often referred to as merged pole devices. A device can be a read device that only reads data, a write device that only writes data, or a read-write device that both reads and writes data. In the illustrative example, devices 200 through 207 are read-write devices.

Read-write devices 200 through 207 form a single linear array or module on a magnetic recording head. Each array is built on a single substrate. The devices on the array are not limited to the illustrated example. Devices 200 through 207 may be all read devices, all write devices, all read-write devices, or any combination thereof. In the illustrative example, devices 200 through 207 are all read-write devices.

In the perspective shown, a magnetically coated recording media (not shown) travels in direction 210. In other words, a recording media travels above read-write devices 200 through 207. The perspective shown is commonly referred to as a tape bearing surface view.

Tracks 220 through 227 are created or read by read-write devices 200 through 207 respectively. The location of tracks 220 through 227 relative to read-write devices 200 through 207 depends on the function that read-write devices 200 through 207 adopt. In the illustrative example, read-write devices 200 through 207 functions in write mode. Thus, the recording media travels across read-write devices 200 through 207 as tracks 220 through 227 are created. If, for example, read-write devices 200 through 207 are functioning in read mode, then tracks 220 through 227 on the recording media would exist prior to and after traveling across read-write devices 200 through 207.

Read-write devices 200 through 207 each create an individual corresponding track. For example, in the illustrative example, read-write device 200 writes data onto the recording media and creates track 220. Additionally, read-write device 201 writes data onto recording media 210 and creates parallel track 221. Track 221 is adjacent to track 220. The same process of writing and creating a track occurs for read-write devices 202 through 207. If, on the other hand, read-write devices 200 through 207 are functioning in read mode, then read-write devices 200 through 207 would read data on tracks 220 through 227 respectively.

Conventional recording devices, such as magnetic recording head drive 100 of FIG. 1, usually include two or more arrays of read-write devices that are mechanically glued together. Each array of devices is connected to a separate substrate. The use of two or more arrays gives magnetic recording head drive 100 the capability to read as the recording media moves either forwards, or in direction 210, or backwards, or in a direction opposite to direction 210.

Figure 3:
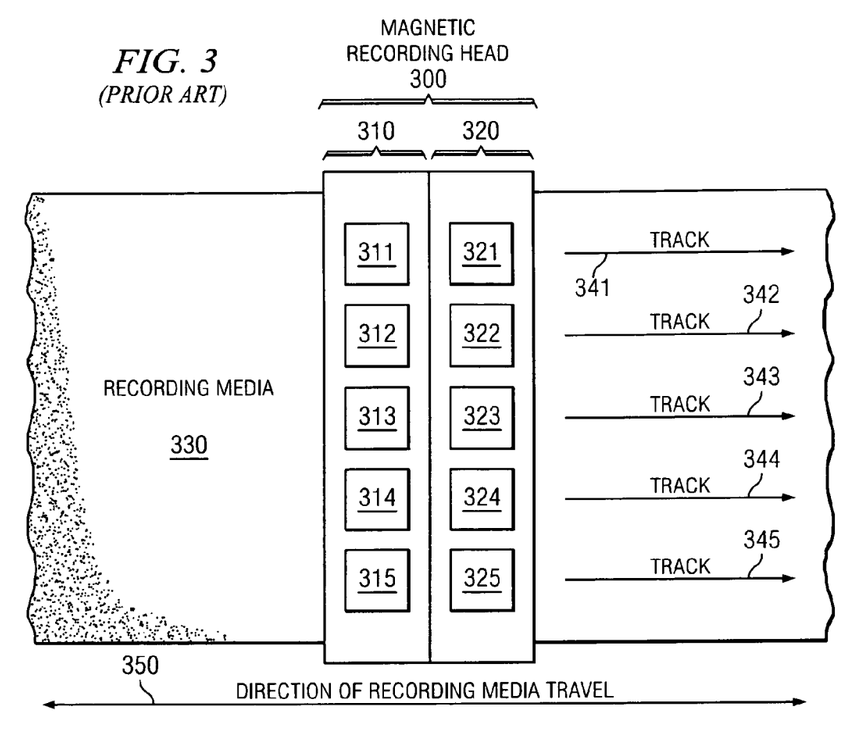
FIG. 3 illustrates a tape bearing view of a conventional magnetic recording head with two arrays of read-write devices.

FIG. 3 illustrates a tape bearing view of a conventional magnetic recording head with two arrays of read-write devices. Magnetic recording head 300 may be implemented as magnetic recording head 140 of FIG. 1.

Magnetic recording head 300 includes arrays 310 and 320. Arrays 310 and 320 are each built on a separate substrate and are mechanically glued together to form magnetic recording head 300. Each array 310 and 320 contains five read-write devices. Array 310 has read-write devices 311 through 315, and array 320 has read-write devices 321 through 325. Read-write devices 311 through 315 and 321 through 325 are similar to read-write devices 200 through 207 of FIG. 2. In other examples, devices 311 through 315 and 321 and 325 can also be read only devices, write only devices, or any combination thereof.

Recording media 330 travels across magnetic recording head 300. In the illustrative example, read-write devices 311 through 315 write data onto recording media 330 and create corresponding tracks 341 through 345 as a result of writing data onto recording media 330. Read-write devices 321 through 325 read the data created by read-write devices 311 through 315. In other words, read devices 321 through 325 read the data written onto tracks 341 through 345 by read-write devices 311 through 315. In an alternative example, read-write devices 321 through 325 can also write data onto recording media 330 and create a separate, additional track onto recording media 330.

In the illustrative example, recording media 330 can travel forwards or backwards across magnetic recording head 300, as illustrated by direction 350. Therefore, read-write devices 311 through 315 can read the same tracks, in this case tracks 341 through 345, which read-write device 311 through 315 themselves created. Read-write device 311 through 315 can also read the tracks created by read-write device 321 through 325. Likewise, read-write device 321 through 325 can read the tracks, 341 through 345, created by read-write devices 311 through 315 as well as the tracks created by themselves.

Figure 4:
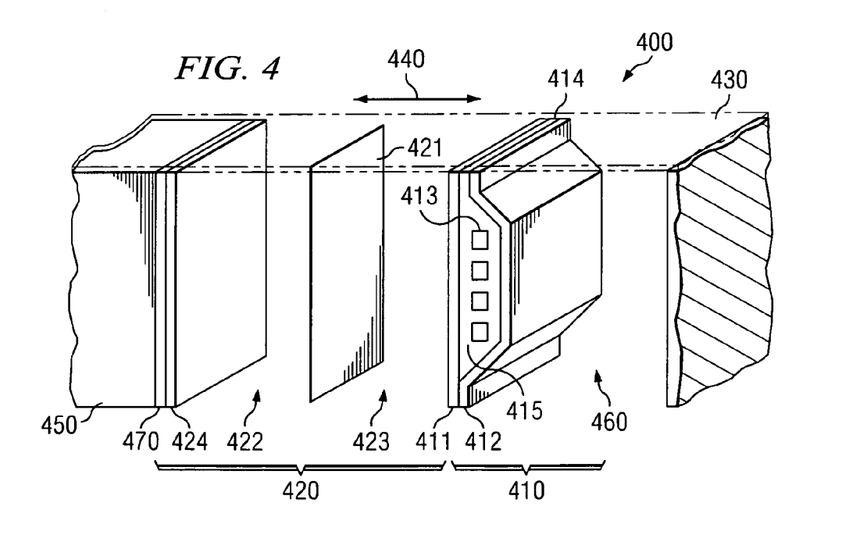
FIG. 4 is a sectional, exploded view of a read-write device, which may be used within an illustrative embodiment of the present invention.

FIG. 4 is a sectional, exploded view of a read-write device, which may be used within an illustrative embodiment of the present invention. The illustrative example is modified for clarity and is not drawn to scale. Read-write device 400 can be implemented as read-write devices 200 through 207 of FIG. 2.

In the illustrative example, read-write device 400 includes write component 410 and read component 420. Write component 410 contains shared shield 411, top pole 412, conductive coil 413, gap 414, and insulation layer 415. In an alternative embodiment where read-write device 400 is only a write device, shared shield 411 is identified as a bottom pole. However, in this example, shared shield 411 is shared by both write component 410 and read component 420.

Shared shield 411, top pole 412, and conductive coil 413 form an electromagnet in write component 410. A current in coil 413 induces flux in poles 411 and 412. The flux produces a field at gap 414. As a recording media moves across recording media contact surface 430 in recording media direction 440, the field produced by the current in coil 413 produces magnetization fields on the recording media. The magnetization fields result in data being written onto the recording media.

Poles 411 and 412 are typically constructed of a magnetically permeable alloy or an amorphous mixture, which is made from at least one of the following elements: cobalt or iron. Coil 413 is a conductor that is insulated from poles 411 and 412 by insulation layer 415. Coil 413 may be made from a copper material. Insulation layer 415 is built from layers of hard baked photoresist with a layer of alumina against one of poles 411 or 412. The alumina also extends into gap 414.

In the illustrative example, read component 420 includes a magnetoresistive sensor, such as sensor 421. Sensor 421 is separated from bottom shield 424 and shared shield 411 by insulating alumina gaps 422 and 423. As a recording media travels over recording media contact surface 430 in recording media direction 440, the magnetic fields on the recording media cause magnetoresistive sensor 421 to change resistance and enable the data stored on the recording media to be read.

In the illustrative example, read-write device 400 is built upon substrate 450 and capped with insulating overcoat 460. Substrate 450 is constructed from a ceramic with good wear properties, such as aluminum titanium carbide (AlTiC), and coated with insulating alumina underlayer 470. Overcoat 460 is a thick aluminum oxide (alumina) film.

Read-write device 400 is not limited to the illustrative example. One of ordinary skill in the art will recognize a wide variety of construction for read-write device 400 that does not deviate from the spirit and scope of the aspects of the present invention. For example, various other materials, geometries, and orientations may be used for write component 410 and read component 420.

Figure 5:
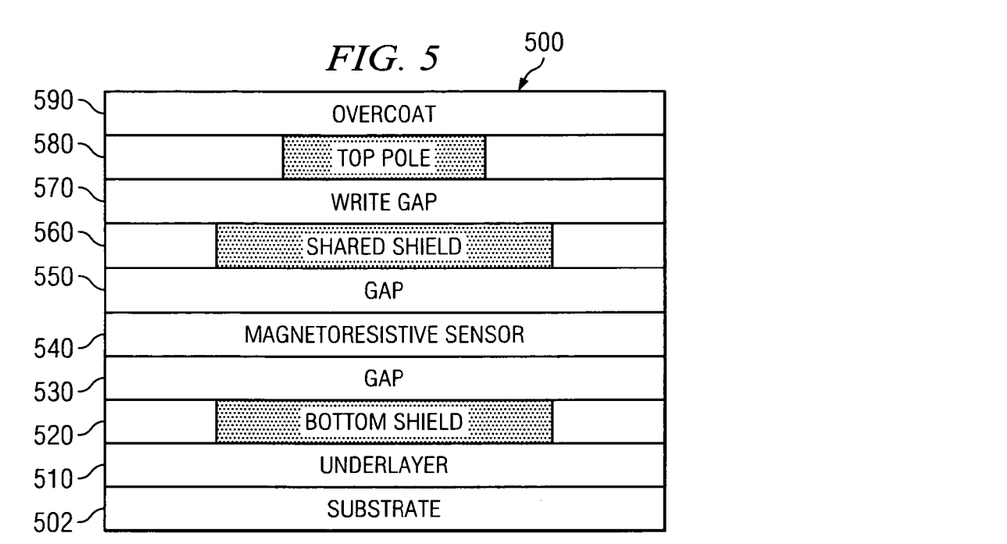
FIG. 5 is a schematic diagram illustrating the components of a conventional read-write device as seen from the tape bearing surface, which may be used within an illustrative embodiment of the present invention.

FIG. 5 is a schematic diagram illustrating the components of a conventional read-write device as seen from the tape bearing surface, which may be used within an illustrative embodiment of the present invention. The components of read-write device 500 are similar to the components of read-write device 400 described in FIG. 4.

Read-write device 500 includes substrate 502, underlayer 510, bottom shield 520, gap 530, magnetoresistive sensor 540, gap 550, shared shield 560, write gap 570, top pole 580, and overcoat 590. Substrate 502 is a thin ceramic wafer, usually made from aluminum titanium carbide (AlTiC), which forms the base of read-write device 500. Insulating underlayer 510 is an aluminum oxide (alumina) base layer that read-write device 500 is built upon. Bottom shield 520 limits the amount of recording media that magnetoresistive sensor 540 reads. Bottom shield 520 is made from a magnetic material, such as cobalt zirconium tantalum (CZT), nickel iron (NiFe), or iron nitride (FeN). Insulating gap 530 separates bottom shield 520 from magnetoresistive sensor 540. Insulating gap 530 is similar to insulating gaps 422 and 423 of FIG. 4 and is made of thin alumina films. Magnetoresistive sensor 540, similar to sensor 421 of FIG. 4, is a magnetic read sensor used to read data for a particular track on the recording media. Insulating gap 550 separates magnetoresistive sensor 540 from shared shield 560 and is made from thin alumina films.

Shared shield 560, like bottom shield 520, limits the amount of recording media that magnetoresistive sensor 540 reads. Shared shield 560 serves as a component for both the write and read elements of read-write device 500. Shared shield 560 combines the bottom pole of a write element and the top shield of the read element. Write gap 570 defines the space between the bottom pole and top pole of a write element. In the illustrative example, write gap 570 defines the space between shared shield 560 and top pole 580. Write gap 570 is a non-magnetic spacer. In these examples, write gap 570 is made from layers of alumina and titanium. Top pole 580 is one pole of the magnetic field created by a write element. Overcoat 590 caps read-write device 500. Overcoat 590 is similar to overcoat 460 of FIG. 4.

Figure 6:
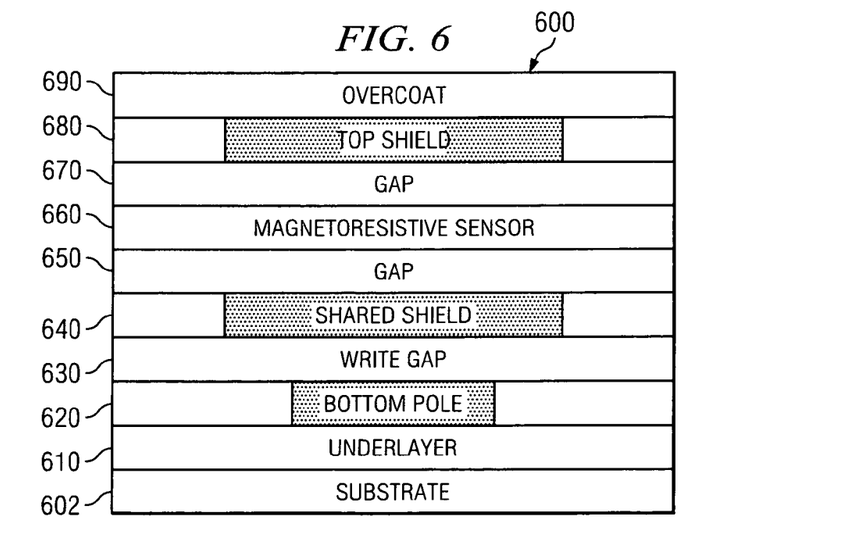
FIG. 6 is a schematic diagram illustrating an alternative example of the components for a conventional read-write device, which may be used within an illustrative embodiment of the present invention.

FIG. 6 is a schematic diagram illustrating an alternative example of the components for a conventional read-write device, which may be used within an illustrative embodiment of the present invention. Read-write device 600 is similar to read-write device 500 of FIG. 5, except that the read and write elements of read-write device 600 are interchanged from the read and write elements of read-write device 500 of FIG. 5.

Read-write device 600 includes substrate 602, underlayer 610, bottom pole 620, write gap 630, shared shield 640, gap 650, magnetoresistive sensor 660, gap 670, top shield 680, and overcoat 690. Substrate 602 is a thin ceramic wafer that forms the base of read-write device 600. Insulating underlayer 610 is an aluminum oxide (alumina) base layer that read-write device 600 is built upon. Bottom pole 620 is one pole of the magnetic field created by the write element. Write gap 630 separates shared shield 640 from bottom pole 620. Shared shield 640 serves as a component for both the write and read elements of read-write device 600. In the illustrative example, shared shield 640 combines the top pole of the write element and the bottom shield of the read element. Insulating gap 650 separates magnetoresistive sensor 660 from shared shield 640. Insulating gap 670 separates top shield 680 from magnetoresistive sensor 660. Top shield 680 is a component of the read element and connects to overcoat 690.

Figure 7:
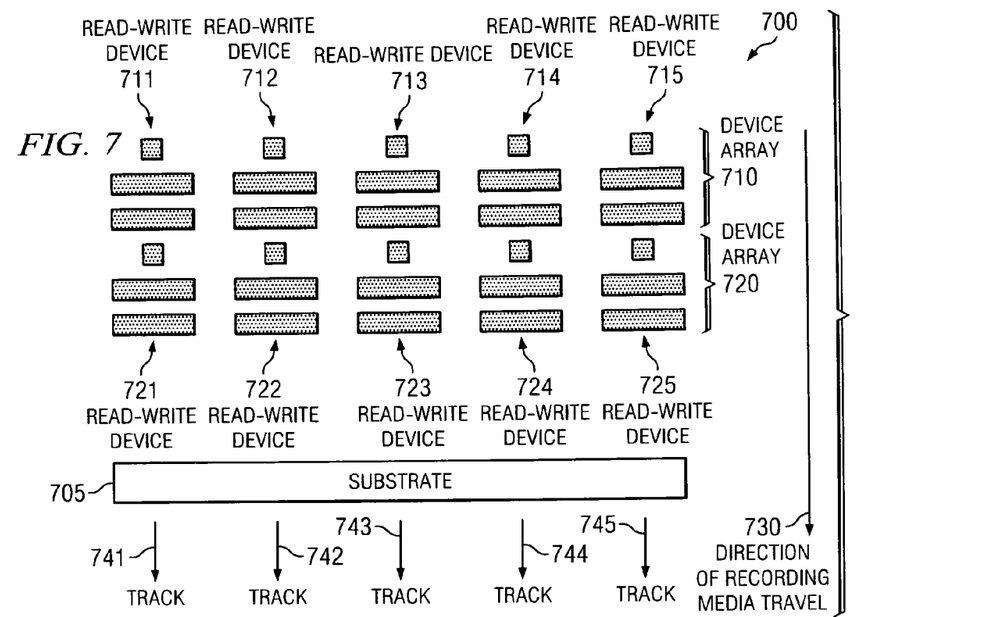
FIG. 7 is a schematic diagram of a bi-directional magnetic recording head built on a common substrate, in accordance with an illustrative embodiment of the present invention.

FIG. 7 is a schematic diagram of a tape bearing surface view of a bi-directional magnetic recording head built on a common substrate, in accordance with an illustrative embodiment of the present invention. Magnetic recording head 700 includes substrate 705 and device arrays 710 and 720. In a conventional magnetic recording head, such as magnetic recording head 300 of FIG. 3, a separate substrate would exist for each device array, 710 and 720. Thus, in a conventional magnetic recording head, device array 710 would be built upon a single substrate, and a device array 720 would be built upon another substrate. However, in the aspects of the present invention, both device arrays 710 and 720 are built upon a single substrate, such as substrate 705. Additionally, the aspects of the present invention provide that device arrays 710 and 720 are supported by the same side of substrate 705.

In the illustrative embodiment, each device array 710 and 720 includes five read-write devices. Device array 710 includes read-write devices 711 through 715, and device array 720 includes read-write device 721 through 725. Read-write devices 711 through 715 and 721 through 725 are a combination device that can both read and write.

In the illustrative embodiment, device arrays 710 and 720 are built on substrate 705. Device array 710 is manufactured and supported upon device array 720. In use, however, arrays 710 and 720 are in the same plane as the tape bearing surface.

Read-write devices 721 through 725 are positioned and aligned with respect to corresponding read-write devices 711 through 715. Read-write devices 721 through 725 may be positioned either directly under or offset of read-write devices 711 through 715. In the illustrative embodiment, read-write device 721 is positioned directly under and aligned with corresponding read-write device 711. However, in alternative embodiments, read-write device 721 may be offset and positioned to the right or left of read-write device 711. Read-write devices 721 through 725 are aligned with read-write devices 711 through 715 using thin film processing techniques.

In the perspective shown in the illustrative embodiment, a magnetically coated recording media (not shown) travels in comparative direction 730. Comparative direction 730 is the direction that magnetically coated recording media travels relative to position or direction of travel of magnetic recording head 700. The recording media travels over substrate 705 and device arrays 710 and 720. In other embodiments, magnetically coated recording media can travel in the opposite direction of comparative direction 730 or at other angles relative to comparative direction 730. The direction of travel depends on the functionality of device arrays 710 and 720.

Magnetic recording head 700 is bi-directional, thereby allowing magnetic recording head 700 to both read and write data on the recording media in two directions. Thus, in the illustrative embodiment, magnetic recording head 700 can read and write data in either direction 730 or opposite to direction 730.

Additionally, device arrays 710 and 720 can operate either in read mode or write mode. Thus, in one situation, device array 710 can function in read mode while device array 720 functions in write mode and vice-versa. Each device array is not limited to an individual function. For example, if device array 710 functions in read mode and device array 720 functions in write mode, then read-write devices 711 through 715 read the data written by read-write devices 721 through 725.

Each read-write device within device arrays 710 and 720 is not limited to the described embodiments. For example, one device array may include both the read function and the write function. Thus, some of the read-write devices in device array 710 can function in read mode while others function in write mode. Typically, however, a corresponding pair of read-write devices in device arrays 711 and 712 performs opposite functions. A corresponding pair of read-write devices is the pair of devices that are directly connected to and aligned with each other. Each read-write device in a corresponding pair resides in a separate device array. For example, read-write devices 711 and 721 form a corresponding pair and read-write devices 712 and 722 form a corresponding pair. Thus, typically, read-write devices 711 and 721 perform opposite functions. Thus, if read-write device 711 operates in read mode, then read-write device 721 operates in write mode. However, other embodiments exist in which both read-write devices in the corresponding pair function in the same mode.

Read-write devices 711 through 715 and 721 through 725 create and read corresponding tracks 741 through 745. Tracks 741 through 745 store data on the recording media. Each corresponding pair of read-write device in device arrays 710 and 720 creates or read one track. For example, read-write devices 711 and 721 would create and read corresponding track 741.

The individual read-write devices in device arrays 710 and 720 are not limited to the illustrated embodiment. For example, the individual devices can be a read only device or write only device as well. Additionally, the individual devices can be a combination of a number of read and/or write elements in a single read-write device. Furthermore, each device array may include more or less read-write devices. Moreover, the present invention can include a number of device arrays and is not limited to two device arrays on a single magnetic recording head. A plurality of device arrays can be stacked onto substrate 705.

Figure 8:
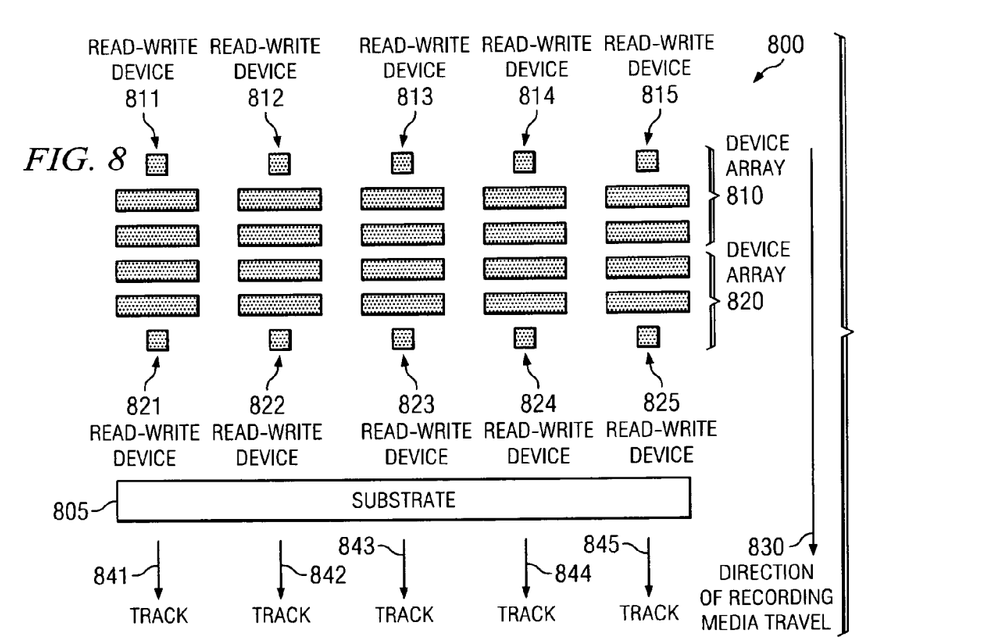
FIG. 8 is a schematic diagram for an alternative embodiment of a bi-directional magnetic recording head built on a common substrate, in accordance with an illustrative embodiment of the present invention.

FIG. 8 is a schematic diagram for an alternative embodiment of a bi-directional magnetic recording head built on a common substrate, in accordance with an illustrative embodiment of the present invention. Magnetic recording head 800 is similar to magnetic recording head 700 of FIG. 7, except the read and write, elements for the read-write devices in one array are interchanged. Magnetic recording head 800 is taken from a tape bearing surface perspective.

Magnetic recording head 800 includes substrate 805 and device arrays 810 and 820. In the illustrative embodiment, substrate 805 supports both device arrays 810 and 820. Device array 810 includes read-write devices 811 through 815, and device array 820 includes read-write devices 821 through 825. Read-write device 500 of FIG. 5 can be implemented as read-write devices 811 through 815. Read-write device 600 of FIG. 6 can be implemented as read-write devices 821 through 825.

In the illustrative embodiment, device array 820 connects to substrate 805. Device array 810 connects to and is supported upon device array 820. The aspects of the present invention provide that the same side of substrate 805 supports device arrays 810 and 820. In the illustrative embodiment, read-write devices 821 through 825 are positioned and aligned with respect to corresponding read-write devices 811 through 815. Thus, for example, read-write device 821 is directly under and aligned with corresponding read-write device 811. In an alternative embodiment, read-write devices 821 through 825 may be positioned offset from corresponding read-write devices 811 through 815. Thus, for example, read-write device 821 may be positioned to the right or left of corresponding read-write device 811. In the illustrative embodiment, read-write devices 821 through 825 are aligned with read-write devices 811 through 815 using thin film processing techniques.

In the perspective shown, a magnetically coated recording media (not shown) travels in comparative direction 830. The recording media travels over substrate 805 and device arrays 810 and 820. In other embodiments, magnetically coated recording media can travel in the opposite direction of comparative direction 830 or at other angles relative to the comparative direction 830. The comparative direction of travel depends on the functionality of device arrays 810 and 820.

Magnetic recording head 800 is bi-directional, thereby allowing the recording media to travel in comparative direction 830 or opposite to comparative direction 830. Device arrays 810 and 820 can run either in read mode or write mode. Additionally, each device array is not limited to an individual function. Typically, however, a corresponding pair of read-write devices in device arrays 810 and 820 performs opposite functions.

Read-write devices 811 through 815 and 821 through 825 create and read corresponding tracks 841 through 845. Tracks 841 through 845 store data on the recording media. Each corresponding pair of read-write device in device arrays 810 and 820 creates or read one track. For example, read-write devices 811 and 821 would create and read corresponding track 841.

The individual read-write devices in device arrays 810 and 820 are not limited to the illustrated embodiment. For example, the individual devices can be a read only device or write only device as well. Additionally, the individual devices can be a combination of a number of read and/or write elements in a single read-write device. Furthermore, each device array may include more or less read-write devices. Moreover, the present invention can include a number of device arrays and is not limited to two device arrays on a single magnetic recording head. A plurality of device arrays can be stacked onto substrate 805.

Figure 9:
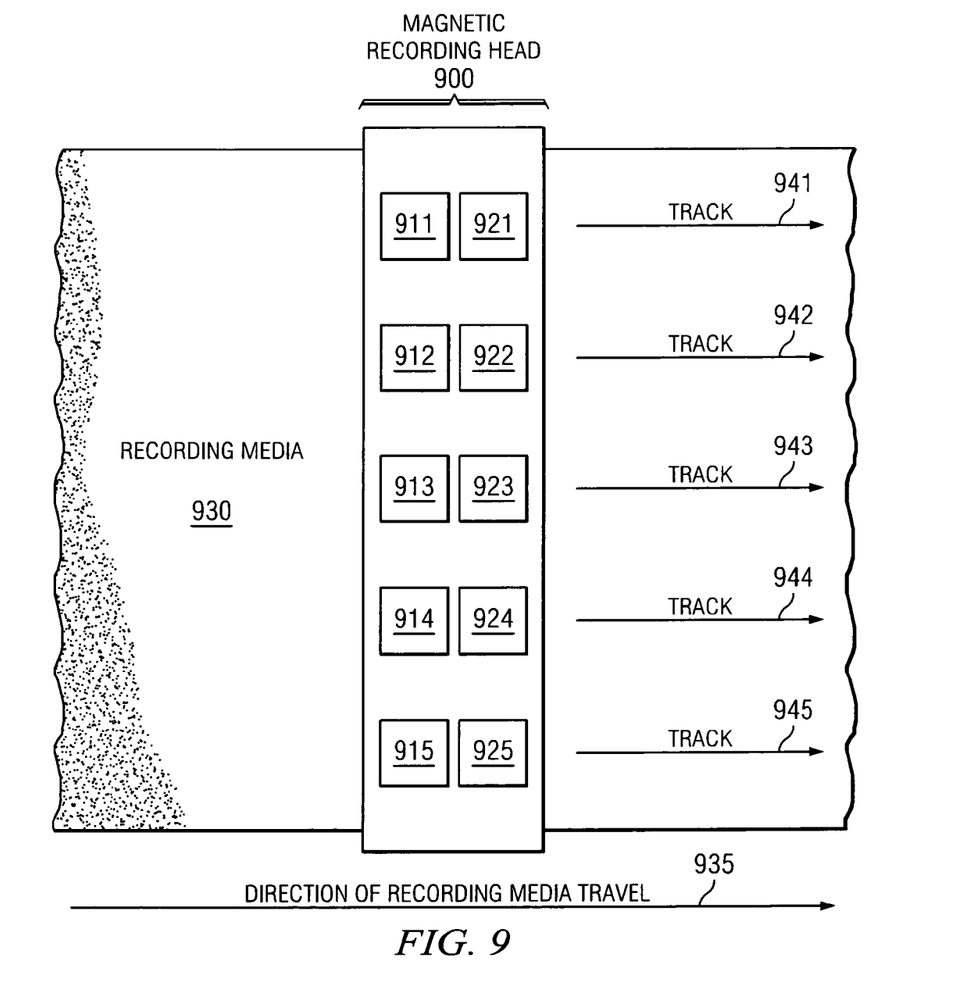
FIG. 9 illustrates a top-view arrangement of a bi-directional magnetic recording head, in accordance with an illustrative embodiment of the present invention.

FIG. 9 illustrates a top-view arrangement of a bi-directional magnetic recording head, in accordance with an illustrative embodiment of the present invention. Magnetic recording head 900 is similar magnetic recording head 700 of FIG. 7 and magnetic recording head 800 of FIG. 8, but illustrates a different perspective of the aspects of the present invention.

Magnetic recording head 900 includes read-write devices 911 through 915 and 921 through 925. Each read-write device 911 through 915 is aligned linearly and adjacent to another read-write device 911 through 915. Each read-write device 921 through 925 is aligned linearly and adjacent to another read-write device 921 through 925. Read-write devices 921 through 925 are supported upon and aligned with corresponding read-write devices 911 through 915. Thus, for example, read-write device 921 is supported upon and aligned with read-write device 911.

Recording media 930 travels in comparative direction 935 and over read-write devices 911 through 915 and 921 through 925. In the illustrative embodiment, tracks 941 through 945 are data tracks created by and read by corresponding pairs of read-write devices 911 through 915 and 921 through 925. Each corresponding pair of read-write devices creates or reads one track. Thus, for example, read-write devices 911 and 921 form a corresponding pair and create or read track 941.

Figure 10:
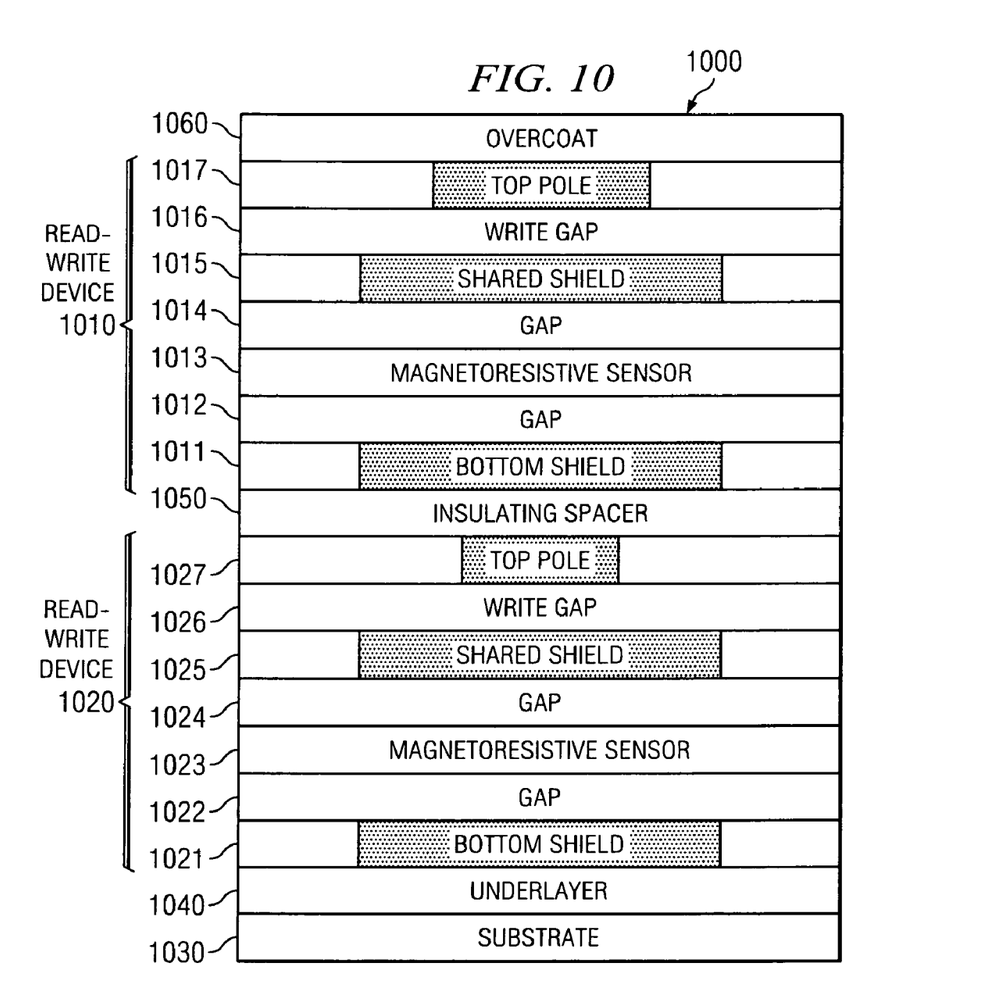
FIG. 10 is a schematic diagram illustrating the architecture of a bi-directional magnetic recording head, in accordance with an illustrative embodiment of the present invention.

FIG. 10 is a schematic diagram illustrating the architecture of a bi-directional magnetic recording head, in accordance with an illustrative embodiment of the present invention. Magnetic recording head 1000 is similar to recording 700 of FIG. 7. In the illustrative embodiment, magnetic recording head 1000 illustrates a corresponding pair of read-write devices. In other embodiments, magnetic recording head 1000 may include a number of corresponding pairs of read-write devices or a number of arrays of corresponding pairs of read-write devices.

Magnetic recording head 1000 includes read-write devices 1010 and 1020, substrate 1030, insulating spacer 1050, and overcoat 1060. Read-write device 1020 connects to substrate 1030 through underlayer 1040. Read-write device 1010 is connected to and supported upon read-write device 1020. Read-write devices 1010 and 1020 are supported by the same side of substrate 1030. Overcoat 1060 caps magnetic recording head 1000.

Read-write device 1010 includes bottom shield 1011, gap 1012, magnetoresistive sensor 1013, gap 1014, shared shield 1015, write gap 1016, and top pole 1017. Read-write devices 1020 have similar components as read-write device 1010. Read-write device 1020 includes bottom shield 1021, gap 1022, magnetoresistive sensor 1023, gap 1024, shared shield 1025, write gap 1026, and top pole 1027.

Insulating spacer 1050 connects read-write device 1010 to read-write device 1020. Specifically bottom shield 1011 connects to one side of insulator spacer 1050, and top pole 1027 connects to the other side insulator spacer 1050.

In processing, read-write device 1010 aligns with and is supported upon read-write device 1020 using a thin film processing technique. Read-write device is built directly on read-write device 1020. Read-write device 1010 is not mechanically aligned with read-write device 1020 after each read-write device is individually built. To the contrary, each component within each read-write device is deposited onto the previous component. Thus, for example, after read-write device 1020 is built and insulator spacer 1050 is deposited onto top pole 1027, bottom shield 1011 is then deposited onto insulating spacer 1050. The remaining components of read-write device 1010 are then deposited onto the previous component until read-write device 1010 is completely formed. The process of depositing individual components rather than a completed device allows for accurate alignment of each read-write device and the components within each read-write device. Additionally, the process of depositing individual components eliminates the need to mechanically realign each read-write device after the entire magnetic recording head is formed.

Magnetic recording head 1000 is not limited to the illustrative embodiment. For example, magnetic recording head 1000 may include a number of read-write devices supported upon substrate 1030. Additionally, read-write devices 1010 and 1020 may be a number of devices aligned in a linear array.

Additionally, devices 1010 and 1020 are not limited to the illustrated embodiment. For example, devices 1010 and 1020 may be a read-only device or a write-only device. If, for example, device 1010 were a read-only device and device 1020 were a write-only device, the aspects of the present invention provide a magnetic recording head architecture similar to magnetic recording head 1000. The architecture in this example would not result in the conventional read-write device. The aspects of the present invention provides an insulating spacer, such as insulating spacer 1050, to connect read device 1010 and write device 1020. On the other hand, in the conventional read-write device, read-device 1010 and write device 1020 have a shared shield, such as shared shield 1025.

The aspects of the present invention also provide for an insulating spacer that includes an additional shield. The shield decreases the interference developed between read-write devices 1010 and 1020. Thus, the shield minimizes the transmitted signals between the read and write elements of read-write devices 1010 and 1020. The transmitted signal can reduce the ability of the read channel from decoding the data written on the recording media.

The shield may be a magnetic or conductive shield made of several layers of different materials. A magnetic shield may include layers of permeable material, such as iron alloy, nickel alloy, or any other combination of magnetically soft material. Conductive shielding can include layers of conductive material, such as copper, gold, or any combination of conductive materials. The shield may also be a combination of magnetic and conductive layers.

Figure 11:
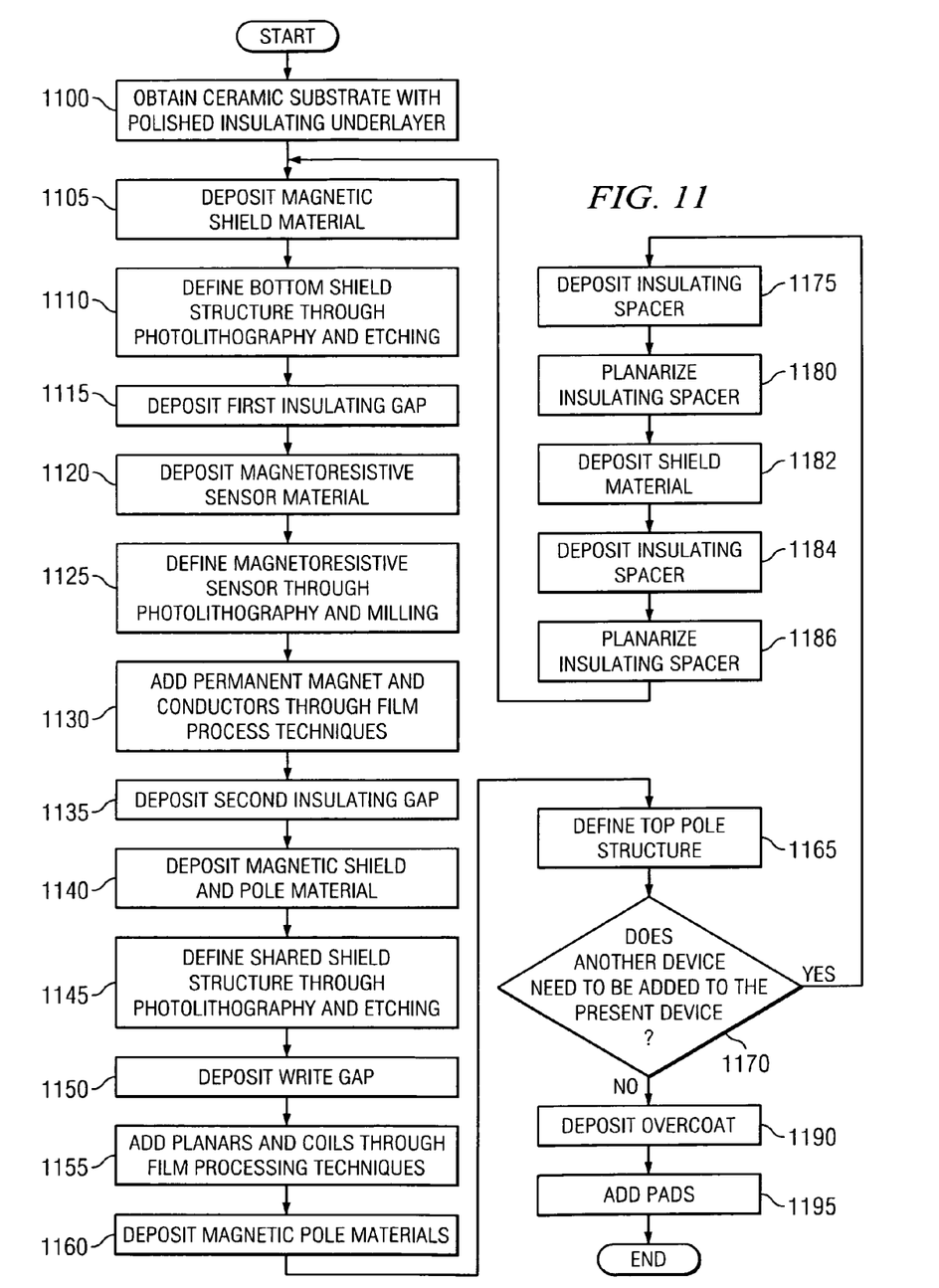
FIG. 11 is a flowchart for the process of manufacturing a bi-directional magnetic recording head, in accordance with an illustrative embodiment of the present invention.

FIG. 11 is a flowchart for the process of manufacturing a bi-directional magnetic recording head, in accordance with an illustrative embodiment of the present invention. The magnetic recording head is similar to magnetic recording head 1000 of FIG. 10.

The manufacturing process begins with obtaining a ceramic substrate with a polished insulating underlayer (step 1100). The process then deposits the material for the magnetic shield onto the ceramic substrate (step 1105). The process then defines the bottom shield structure through the processes of photolithography and etching (step 1110). The process then deposits the first insulating gap onto the bottom shield (step 1115) and deposits the material for the magnetoresistive sensor onto the first insulating gap (step 1120). The process then defines the magnetoresistive sensor through the processes of photolithography and milling (step 1125). Film processing techniques then add permanent magnets and conductors onto magnetoresistive sensor (step 1130). The process then deposits the second insulating gap (step 1135). The process then deposits the materials for the magnetic shield and pole onto the second insulating gap to form the shared shield (step 1140). The process then defines the shared shield structure through the processes of photolithography and etching (step 1145). The process then deposits the write gap (step 1150) and adds planars and coils through film processing techniques (step 1155). The process then deposits magnetic pole materials to form the top pole (step 1160). The process then defines the top pole structure (step 1165).

A determination is then made as to whether another device is to be added to the present device (step 1170). If another device is to be added ("yes" output to step 1170), then the process deposits an insulating spacer (step 1175). The process then planarizes or polishes smooth the insulating spacer to remove any lumps existing in the insulating spacer (step 1180). The process then deposits shield material (step 1182). Next, the process deposits an insulating spacer (step 1184) and planarizes the insulating spacer (step 1186). The process then returns to step 1105 and repeats the process (steps 1105 through 1165). If another layer is not to be added ("no" output to step 1170), then the cover layer is deposited (step 1190) and pads are added to the magnetic recording head (step 1195). The process terminates thereafter.

What is claimed is:

1. A magnetic recording head drive comprising:
   a reel for rotating recording media across a magnetic recording head; and
   a bi-directional magnetic recording head that reads and writes data onto the recording media, the magnetic recording head comprising at least the following layers positioned in order:
   a substrate;

an underlayer positioned after the substrate;
a first bottom shield positioned after the underlayer;
a first gap positioned after the first bottom shield;
a first magnetoresistive sensor positioned after the first gap;
a second gap positioned after the first magnetoresistive sensor;
a first shared shield positioned after the second gap;
a first write gap positioned after the first shared shield;
a first top pole positioned after the first write gap;
an insulating spacer positioned after the first top pole;
a second bottom shield positioned after the insulating spacer;
a third gap positioned after the second bottom shield;
a second magnetoresistive sensor positioned after the third gap;
a fourth gap positioned after the second magnetoresistive sensor;
a second shared shield positioned after the fourth gap;
a second write gap positioned after the second shared shield;
a second top pole positioned after the second write gap; and
an overcoat positioned after the second top pole.

2. The magnetic recording head drive of claim 1 wherein the insulating spacer further comprises:
a shield within the insulating spacer.

* * * * *

UNITED STATES PATENT AND TRADEMARK OFFICE
CERTIFICATE OF CORRECTION

PATENT NO. : 7,656,610 B1  Page 1 of 1
APPLICATION NO. : 11/389901
DATED : February 2, 2010
INVENTOR(S) : Campos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-eighth Day of December, 2010

David J. Kappos
*Director of the United States Patent and Trademark Office*